Patented Dec. 14, 1948

2,456,470

UNITED STATES PATENT OFFICE 2,456,470

REFINING OF INOSITOL SOLUTIONS

McCalip J. Thomas, Decatur, Ill., assignor to A. E. Staley Manufacturing Company, Decatur, Ill., a corporation of Delaware No Drawing. Application December 5, 1945, Serial No. 633,047

2 Claims. (Cl. 260—631)

This invention relates to an improved process for refining crude inositol solutions, especially those obtained by hydrolysis of phyton, and whose final pH values do not exceed about 9, having particular reference to the recovery of increased yields of substantially chemically pure inositol therefrom in a more economical and facile manner than ever before attained, and the provision of such a process is a principal object of the invention.

The term phytin as used herein refers to salts of phytic acid occurring in plant materials. Phytic acid is a phosphoric acid ester of inositol, and phytin is obtained as a precipitate when suitable acidic extracts of plant materials, such as corn steepwater, are neutralized. Phytin thus obtained from corn steepwater consists primarily of a calcium-magnesium salt of phytic acid.

Hydrolysis of phytic acid or its derivatives, such as phytin, yields inositol. Numerous procedures for accomplishing the hydrolysis, which involve heating the inositol ester with aqueous acid or alkali, or with water alone, are described in the chemical literature. Particular reference is made to the article by Bartow and Walker published in the Journal of Industrial and Engineering Chemistry, volume 30, pages 300 to 303 (1938).

Phytin from corn steepwater is one of the principal cheap raw materials from which inositol can be prepared. Ordinarily, crude phytin from corn steepwater is used industrially even though it contains some insoluble colored and nitrogenous impurities as well as traces of steepwater mother liquor. Removal of these impurities prior to hydrolysis is rather difficult and hence uneconomical, resulting in low theoretical yields of inositol from phytin. Because of the impurities the phytin hydrolyzate containing the inositol is dark colored. The hydrolyzate is also contaminated with acid salts of phosphoric acid that are split away from the phytin by hydrolysis.

The same difficulties in general are encountered in refining of the hydrolyzates of crude phytin obtained from other sources, such as sorghum grain and the brans of rice, wheat, or rye; the liquors are dark colored, difficult to decolorize by methods heretofore used, and contain high proportions of inorganic phosphates.

Refining of the dark colored and salt containing hydrolyzates of phytin has long been recognized as a difficult problem in the production of inositol from this raw material. This is especially true of the acid hydrolyzates obtained by digestion of phytin with aqueous acids or with water alone. Alkaline hydrolyzates of phytin are also dark colored, but for some unknown reason they are in general much easier to decolorize than the acidic ones. In particular, this distinction applies to those hydrolyzates whose final pH is not less than about 9. As the pH of the phytin hydrolyzate ranges downward from about 9 to about 3, there is a steady and rapid increase in the difficulty of decolorizing the hydrolyzate with activated carbon.

As in the hydrolysis of any ester, hydrolysis of phytin is attended by the development of acidity which may either lower the pH of the hydrolyzing medium or neutralize its alkalinity. For example, when phytin is hydrolyzed by heating it with neutral water, the final hydrolyzate will be acid as represented by a pH within the range of about 3.0 to 3.5. Likewise, hydrolysis of a strongly alkaline slurry of phytin and dilute aqueous sodium hydroxide, having an initial pH in the range of 11 to 12, may lower the hydrolyzate pH to a value within the range of 5 to 6 because it produces more than enough acidity to neutralize alkali present. This invention is not restricted to those phytin hydrolyzates whose pH at any time during hydrolysis does not exceed about 9; it applies to all those phytin hydrolyzates whose pH at substantial completion of hydrolysis does not exceed about 9.

Heretofore, some relatively pure inositol, colorless and substantially free of ash, has been obtained from the non-strongly alkaline phytin hydrolyzates only by time consuming and costly procedures involving repeated decolorizations with activated carbon and numerous recrystallizations. The prior art suggests procedures for precipitation of inositol from the concentrated hydrolyzate, or concentrated aqueous extract of the product, by adding thereto a water miscible precipitant for inositol such as ethyl alcohol or acetic acid.

The present invention provides a relatively simple, rapid, and inexpensive process for the refining of non-strongly alkaline phytin hydrolyzates whereby inositol of excellent quality and in high yield can be crystallized directly therefrom after suitable concentration. One recrystallization from water of the inositol thus obtained yields a product that is colorless and substantially free of ash (less than 0.05 per cent ash).

This invention is based primarily upon the discovery that decolorization with activated carbon of the non-strongly alkaline phytin hydrolyzates referred to above is greatly improved if, prior to the carbon treatment, the hydrolyzate is made alkaline to a pH of 9 or higher, preferably to a value within the range of 10 to 12, and heated. Apparently this treatment eliminates or favorably modifies colored materials that resist adsorption by the activated carbon. If desired, the hot hydrolyzate may be made alkaline and then held at the elevated temperature for a suitable length of time. In general, this will be more expedient than alkalizing the cooled hydrolyzate and then heating it.

In carrying out the process of this invention, the phytin hydrolyzate may be made alkaline by adding a base to it. Any suitable base may be used for this purpose provided it is strong enough to raise the hydrolyzate pH to at least 9, and provided it exerts no deleterious action on the inositol. Suitable classes of bases are the oxides, hydroxides, and carbonates of the alkali metals, the oxides and hydroxides of the alkaline earth metals, quaternary ammonium hydroxides, and aliphatic amines including ammonia. Preferably an alkaline earth metal or an alkaline-reacting compound of the metal is employed, because such alkalizing agents, lime for example, precipitate phosphates from the phytin hydrolyzate. This precipitation has two beneficial effects. One is that it reduces the concentration of inorganic salts in the solution from which the inositol is crystallized, thus facilitating crystallization and reducing the ash content of the inositol. The other is that the flocculent phosphate precipitate has a defecating action on the hydrolyzate. This also improves the crystallization of inositol from the concentrated hydrolyzate, and increases the efficiency of the subsequent decolorization with activated carbon.

The effective alkalizing agent furnished in aqueous solution by the alkaline earth metals and their alkaline reacting compounds is the hydrate or hydroxide of the metal. The free metal, its oxide, its carbonate, and other salts with weak acids all react with water to form at least some of the hydroxide and the corresponding ions.

Volatile bases, preferably ammonia because of its high volatility and low cost, are also advantageously used in alkalizing the phytin hydrolyzate. The chief advantage of this type of base is that it can be easily removed subsequently from the hydrolyzate by distillation or aeration. Ammonia and the lower aliphatic amines are sufficiently basic to produce the desired degree of alkalinity in the hydrolyzate. Aliphatic amines containing not more than about 6 carbon atoms are suitable because they are fairly easily removable from solution by steam distillation. Ammonia possesses the additional advantage that it assists the removal of magnesium acid phosphate from the hydrolyzate by converting it into insoluble magnesium ammonium phosphate.

Hydrolysis of phytin yields, in addition to inositol, acid phosphates of calcium and magnesium. Alkalizing the phytin hydrolyzate to a pH of not less than 9 with an alkaline earth metal hydroxide introduces more metal than is required to combine with the acid phosphates that are present. It is desirable to remove the excess metal and, in general, as much inorganic salt as possible from the solution prior to crystallizing the inositol. This is accomplished by another feature of the invention, which comprises acidifying the alkalized hydrolyzate to a pH value lying within the range of about 6.0 to about 6.5 with an acid that forms an insoluble salt with the alkaline earth metals. It has been found that such acidification provides a maximum precipitation of inorganic salts from the hydrolyzates. The acidification is also of benefit to the decolorization with activated carbon, inasmuch as most such carbons operate more efficiently in acid than in alkaline solution. Examples of suitable acids for this purpose are phosphoric, sulfuric, and oxalic. Phosphoric acid is preferred, even though it is more expensive than sulfuric acid, because it removes the highest proportion of salts from the hydrolyzate.

The foregoing acidification step may be omitted when the phytin hydrolyzate is alkalized with a volatile base, such as ammonia, for example.

After the phytin hydrolyzate has been acidified, as explained above, it is then preferably heated and subsequently filtered or centrifuged to remove insoluble matter that forms. Heating promotes formation and coagulation of a precipitate in the liquor. If desired, decolorizing carbon may be added to the acidified hydrolyzate before it is heated and filtered. This mixes the carbon with insoluble phosphates and other solids, but has the advantage that it reduces the number of steps in the process.

If the phytin hydrolyzate is alkalized with ammonia and then boiled or aerated to remove excess ammonia, a precipitate usually appears in the liquor and the liquor acquires in general a faintly acidic reaction. The liquor may then be clarified by any suitable means, and afterward decolorized with activated carbon, or it may be treated with the carbon before being clarified.

To obtain maximum benefit from alkalizing the phytin hydrolyzate, the alkalized liquor may be heated to a temperature of not less than about 125° F. Higher temperatures may be employed if desired. Excellent results are obtained within the range of 165° to 195° F. Boiling temperatures of 210° F. to 215° F., and even considerably higher temperatures, under pressure, are not detrimental. The duration of heating, to obtain best results, depends upon the temperature, being less at high temperatures than at low. At 165° F., the preferred minimum heating time is about 15 minutes; at 125° F., it is about 60 minutes; and at 195° F., it is reduced to about 5 minutes. These heating periods may be substantially increased without harming the inositol or interfering with operation of the process.

After the phytin hydrolyzate has been refined and decolorized as set forth above, and then concentrated sufficiently, inositol that is colorless and very low in ash will crystallize from it spontaneously upon cooling. The crystalline product is easily separated from mother liquor in a filter or centrifuge, and after one recrystallization from water it is substantially pure (less than 0.05 per cent ash). A second crop of high grade product can be crystallized from the concentrated mother liquor. In general, however, it will contain more ash than the first crop.

The present invention may be more specifically illustrated by the following examples in which all parts are by weight, and all liquor densities are based on a liquor temperature of 60° F.

*Example 1*

Wet phytin cake, prepared by neutralizing corn steepwater with lime and collecting and washing the resultant precipitate in a filter press, was mixed with water to the consistency of a thin paste and heated for 6 hours with steam at a pressure of about 135 pounds per square inch, as described by Bartow and Walker in Industrial and Engineering Chemistry, volume 30 (1938), page 302. The dark colored phytin hydrolyzate thus obtained, diluted considerably with condensed steam and having a pH of about 3.2, was filtered to remove insoluble phosphates, mainly those of calcium and magnesium. The filter cake was washed with water, and the washings were combined with the main filtrate. Lime was then stirred into the combined acidic liquors until the liquor pH was raised to about 10.6. This produced a flocculent precipitate. The alkalized liquor was heated at 160° to 165° F. for about 30 minutes. Additional flocculent precipitate was formed, and the pH of the slurry dropped to about 9.4. The heated slurry was filtered, and the filter cake was washed with water. The washings were added to the main filtrate, and the combined dark yellow liquors were acidified to about 6.1 pH with phosphoric acid. About 10 per cent decolorizing carbon based on the original phytin was added to the acidified liquor, and the slurry thus formed was heated at 160° to 165° F. for about 15 minutes and then filtered hot. The filtrate was water clear. It was concentrated under reduced pressure to a density of about 28° Baumé and allowed to stand at room temperature. Colorless crystals of inositol grew rapidly in the concentrated liquor. After a 24-hour crystallization period, they were filtered from the almost colorless mother liquor, washed with a little ice cold water and dried in an oven at about 230° F. The yield of dry product containing 0.25 per cent ash was 11.3 parts per 100 parts of phytin.

*Example 2*

Wet phytin cake, prepared as set forth in Example 1, was mixed with dilute aqueous sulfuric acid to provide a thin paste containing 10 parts of sulfuric acid per 100 parts of dry phytin. This paste was then heated for 4 hours with steam at a pressure of about 150 pounds per square inch as described in the Bartow and Walker paper referred to in Example 1. The dark colored phytin hydrolyzate thus obtained was filtered to remove insoluble phosphates, alkalized with lime to a pH of about 10.5, heated at 185° to 190° F. for about 15 minutes, filtered, acidified to about 6 pH with phosphoric acid, treated with about 10 per cent decolorizing carbon based on the original phytin, filtered, and concentrated to a density of about 28° Baumé. The concentrated colorless liquor was cooled to a room temperature and allowed to stand for about 24 hours. Colorless crystalline inositol was recovered from the liquor as set forth in Example 1. The yield of dry product containing 0.42 per cent ash was 8.5 parts per 100 parts of phytin.

*Example 3*

Phytin hydrolyzate prepared as set forth in Example 1 was alkalized to about 10 pH with ammonia, heated for 15 minutes at 160° to 165° F., filtered, and concentrated under reduced pressure to a density of about 20° Baumé. The concentrate contained no free ammonia, having a pH of about 6. It was mixed with about 10 per cent decolorizing carbon based on the original phytin, agitated for about 15 minutes, and filtered. The water-clear filtrate was concentrated under reduced pressure to a density of about 28° Baumé, cooled to room temperature, and allowed to stand for 24 hours to permit crystallization of inositol therefrom. The yield of colorless crystalline product containing 0.3 per cent ash was 10.4 parts per 100 parts of phytin.

*Example 4*

The procedure described in Example 1 was repeated except that the phytin hydrolyzate was made alkaline with sodium hydroxide instead of lime. The inositol obtained was colorless and crystalline, but its yield was less, being only 9.4 per cent based on the phytin, and it contained 2.5 per cent ash.

*Example 5*

The procedure of Example 1 was repeated except that the phytin hydrolyzate was alkalized with magnesium oxide instead of lime. There was thus obtained, from 100 parts of phytin, 11.2 parts of colorless, crystalline inositol containing only 0.15 per cent ash.

*Example 6*

Phytin was extracted from wheat bran with warm dilute sulfurous acid and precipitated from the concentrated extract by neutralizing the latter with lime. It was then hydrolized and worked up for inositol as described in Example 1. From 100 parts of dry phytin thus treated, there was obtained 10.7 parts of colorless crystalline inositol containing 0.46 per cent ash.

Since certain changes in carrying out the process which embodies the present invention may be made without departing from the scope of the invention, it is intended that all matter contained in the above examples shall be interpreted as illustrative and not in a limiting sense. Also, the invention comprises the several steps and the relation and order of one or more of such steps with respect to each of the others which will be exemplified in the process disclosed, and the scope of the application of which will be indicated in the claims.

Having described my invention, what I claim as new and desire to secure by Letters Patent, is:

1. A process for refining crude aqueous solutions of inositol obtained by reacting phytin with aqueous media to yield hydrolyzates whose final pH values do not exceed about 9, which comprises subjecting the hydrolyzate to the combination of actions produced thereon by alkalizing the hydrolyzate to a pH of not less than about 9 with an effective alkalizing agent selected from the group consisting of the hydrates of the alkaline earth metals and heating said hydrolyzate to a temperature of not less than about 125° F., separating liquor from solids that precipitate from the hydrolyzate, acidifying said separated liquor to a pH not exceeding about 6.5 with an acid capable of forming a difficultly soluble salt with an alkaline earth metal cation, contacting said acidified liquor with a decolorizing carbon, and separating decolorized liquor from solids including the decolorizing carbon.

2. A process as defined in claim 1 wherein the acid used to acidify the alkalized and heated hydrolyzate is phosphoric acid.

McCALIP J. THOMAS.

REFERENCES CITED

The following references are of record in the file of this patent:

UNITED STATES PATENTS

| Number | Name | Date |
| --- | --- | --- |
| 2,112,553 | Bartow | Mar. 29, 1938 |
| 2,414,365 | Elkin et al | Jan. 14, 1947 |

OTHER REFERENCES

Otolski, Chem. Abs., Vol. 30, 1033 (1936).